United States Patent
Sharma

(10) Patent No.: US 12,465,210 B2
(45) Date of Patent: Nov. 11, 2025

(54) OPTICAL COHERENCE TOMOGRAPHY SYSTEM WITH AN EXTENDED DEPTH RANGE

(71) Applicant: Alcon Inc., Fribourg (CH)

(72) Inventor: Utkarsh Sharma, Solon, OH (US)

(73) Assignee: Alcon Inc., Fribourg (CH)

( * ) Notice: Subject to any disclaimer, the term of this patent is extended or adjusted under 35 U.S.C. 154(b) by 127 days.

(21) Appl. No.: 18/051,317

(22) Filed: Oct. 31, 2022

(65) Prior Publication Data
US 2023/0157538 A1 May 25, 2023

Related U.S. Application Data

(60) Provisional application No. 63/281,531, filed on Nov. 19, 2021.

(51) Int. Cl.
*A61B 3/10* (2006.01)
*G01B 9/02* (2022.01)

(52) U.S. Cl.
CPC ............ *A61B 3/102* (2013.01); *G01B 9/02* (2013.01)

(58) Field of Classification Search
CPC ........ G01B 9/02; G01B 9/02015; A61B 3/102
See application file for complete search history.

(56) References Cited

U.S. PATENT DOCUMENTS

| | | |
|---|---|---|
| 3,780,979 A | 12/1973 | De |
| 4,357,088 A | 11/1982 | Pomerantzeff |
| 5,312,396 A | 5/1994 | Feld |
| 5,909,270 A | 6/1999 | Moser |

(Continued)

FOREIGN PATENT DOCUMENTS

| | | |
|---|---|---|
| AU | 2018274939 B2 | 6/2020 |
| CN | 210009227 U | 2/2020 |

(Continued)

OTHER PUBLICATIONS

Damodaran et al., "Digital micromirror device based ophthalmoscope with concentric circle scanning", 2017, pp. 2766-2780, vol. 8, No. 5, Biomedical Optics Express.

(Continued)

*Primary Examiner* — Dominic J Bologna
*Assistant Examiner* — Justin J Van Cleave
(74) *Attorney, Agent, or Firm* — PATTERSON + SHERIDAN, LLP

(57) ABSTRACT

In certain embodiments, an OCT system sends a sample beam to a sample (e.g., an eye) along a sample path divided into multiple sample path ranges. The system sends a reference beam to a reference arm system with multiple reference arms, where each reference arm corresponds to a sample path range. Each arm has a specific dispersion level with a corresponding dispersion compensation parameter set designed to address the specific level. A detector detects reflected sample and reference beams. A computer performs the following for each sample path range: select the dispersion compensation parameter set corresponding to the reference arm of the sample path range; apply the dispersion compensation parameter set to the detector signal to yield image information; and process the image information. The computer generates an image of the sample from the image information for the sample path ranges.

19 Claims, 4 Drawing Sheets

(56) References Cited

U.S. PATENT DOCUMENTS

| | | | |
|---|---|---|---|
| 6,142,630 A | 11/2000 | Koester | |
| 6,322,556 B1 | 11/2001 | Gwon | |
| 6,789,900 B2 | 9/2004 | Van | |
| 7,374,287 B2 | 5/2008 | Van | |
| 7,510,282 B2 | 3/2009 | Ueno | |
| 7,520,613 B2 | 4/2009 | Saito et al. | |
| 7,703,922 B2 | 4/2010 | Van | |
| 8,480,659 B2 | 7/2013 | Frey et al. | |
| 8,652,602 B1 | 2/2014 | Dolla | |
| 8,783,868 B2 | 7/2014 | Qiu | |
| 8,876,808 B2 | 11/2014 | Feklistov et al. | |
| 8,994,753 B2 | 3/2015 | Nakano | |
| 9,033,500 B2 | 5/2015 | Utsunomiya | |
| 9,603,519 B2 | 3/2017 | Bor et al. | |
| 9,675,243 B2 | 6/2017 | Sasak et al. | |
| 9,789,002 B2 | 10/2017 | Van De Velde | |
| 10,130,511 B2 | 11/2018 | Dantus | |
| 10,478,342 B2 | 11/2019 | Dick | |
| 10,555,835 B2 | 2/2020 | Schuele et al. | |
| 2007/0258094 A1* | 11/2007 | Izatt | G01B 9/02044 356/497 |
| 2007/0291277 A1 | 12/2007 | Everett | |
| 2009/0073384 A1 | 3/2009 | Warden | |
| 2009/0137989 A1 | 5/2009 | Kataoka | |
| 2009/0196477 A1* | 8/2009 | Cense | G01B 9/02083 382/131 |
| 2010/0123873 A1 | 5/2010 | Raymond | |
| 2010/0152847 A1 | 6/2010 | Padrick | |
| 2011/0077557 A1 | 3/2011 | Wing et al. | |
| 2012/0281235 A1* | 11/2012 | Murata | A61B 3/102 356/479 |
| 2013/0131652 A1 | 5/2013 | Dick | |
| 2013/0173029 A1 | 7/2013 | Caldeira et al. | |
| 2014/0058367 A1 | 2/2014 | Dantus | |
| 2014/0216468 A1 | 8/2014 | Goldshleger | |
| 2014/0257257 A1 | 9/2014 | Grant et al. | |
| 2014/0268036 A1 | 9/2014 | Ketterling et al. | |
| 2014/0276674 A1 | 9/2014 | Lee | |
| 2015/0190278 A1 | 7/2015 | Gooding | |
| 2015/0230702 A1* | 8/2015 | Uhlhorn | A61B 3/13 351/246 |
| 2015/0342782 A1 | 12/2015 | Mordaunt | |
| 2016/0058617 A1 | 3/2016 | Luttrull et al. | |
| 2016/0074214 A1 | 3/2016 | Palanker et al. | |
| 2016/0074221 A1 | 3/2016 | Tassignon et al. | |
| 2016/0166431 A1 | 6/2016 | Vogler et al. | |
| 2016/0227999 A1 | 8/2016 | An et al. | |
| 2016/0235588 A1 | 8/2016 | Hart et al. | |
| 2016/0256324 A1 | 9/2016 | Suzuki | |
| 2016/0278629 A1* | 9/2016 | Schuele | A61B 3/1225 |
| 2016/0302969 A1 | 10/2016 | Yamamoto | |
| 2017/0181625 A1 | 6/2017 | Kawakami et al. | |
| 2017/0252213 A1 | 9/2017 | Furuuchi et al. | |
| 2017/0326003 A1 | 11/2017 | Schuele et al. | |
| 2018/0028354 A1 | 2/2018 | Heeren | |
| 2018/0028355 A1 | 2/2018 | Raksi | |
| 2018/0140257 A1 | 5/2018 | Govindjee et al. | |
| 2018/0206719 A1 | 7/2018 | Adler et al. | |
| 2018/0317767 A1 | 11/2018 | Ryan | |
| 2018/0353064 A1 | 12/2018 | Soetikno et al. | |
| 2018/0368915 A1 | 12/2018 | Xia et al. | |
| 2019/0159933 A1 | 5/2019 | Romano et al. | |
| 2019/0282403 A1 | 9/2019 | Barrett et al. | |
| 2019/0290124 A1 | 9/2019 | Laforest et al. | |
| 2019/0313903 A1 | 10/2019 | Mckinnon | |
| 2019/0365569 A1 | 12/2019 | Skovgaard et al. | |
| 2020/0038241 A1 | 2/2020 | Wang et al. | |
| 2020/0060873 A1 | 2/2020 | Heeren | |
| 2020/0085292 A1 | 3/2020 | Fukuma et al. | |
| 2020/0129336 A1 | 4/2020 | Schuele et al. | |
| 2020/0130103 A1 | 4/2020 | Choi | |
| 2020/0192080 A1 | 6/2020 | Karam | |
| 2020/0196853 A1 | 6/2020 | Van Hemert et al. | |
| 2020/0273218 A1 | 8/2020 | Camino et al. | |
| 2020/0397289 A1 | 12/2020 | Ralston | |
| 2020/0400422 A1 | 12/2020 | Ralston | |
| 2021/0100450 A1 | 4/2021 | Amma | |
| 2021/0186753 A1 | 6/2021 | Al-Qaisi et al. | |
| 2021/0275009 A1 | 9/2021 | Yates | |
| 2021/0378507 A1 | 12/2021 | Wallace | |
| 2021/0386586 A1 | 12/2021 | Bor | |
| 2022/0012459 A1 | 1/2022 | Schwiegerling | |
| 2022/0031511 A1 | 2/2022 | Charles | |
| 2023/0157889 A1 | 5/2023 | Bor | |

FOREIGN PATENT DOCUMENTS

| | | |
|---|---|---|
| CN | 108371542 B | 4/2020 |
| CN | 109196333 B | 12/2020 |
| CN | 111281651 B | 12/2020 |
| CN | 112862782 A | 5/2021 |
| CN | 112587302 B | 6/2021 |
| CN | 112587304 B | 6/2021 |
| DE | 19705044 A1 | 8/1998 |
| DE | 102019007147 A1 | 4/2021 |
| DE | 102019007148 A1 | 4/2021 |
| EP | 0770370 A2 | 2/1997 |
| EP | 1212022 B1 | 3/2005 |
| EP | 1563785 A1 | 8/2005 |
| EP | 1638452 B1 | 10/2006 |
| EP | 1838212 A1 | 10/2007 |
| EP | 2144552 A1 | 1/2010 |
| EP | 1928297 B1 | 11/2010 |
| EP | 2459138 A2 | 6/2012 |
| EP | 2525706 A2 | 11/2012 |
| EP | 2898820 A1 | 7/2015 |
| EP | 3061429 A1 | 8/2016 |
| EP | 2890340 B1 | 2/2017 |
| EP | 3459487 A1 | 3/2019 |
| EP | 3501463 A1 | 6/2019 |
| EP | 3636137 A1 | 4/2020 |
| EP | 3861924 A1 | 8/2021 |
| GB | 2469249 A | 10/2010 |
| JP | 5767014 B2 | 6/2015 |
| JP | 2017176558 A | 10/2017 |
| JP | 6410468 B2 | 10/2018 |
| JP | 2018196821 A | 12/2018 |
| JP | 2018196822 A | 12/2018 |
| JP | 2020022569 A | 2/2020 |
| JP | 6736304 B2 | 7/2020 |
| JP | 6839902 B2 | 2/2021 |
| RU | 2661016 C1 | 7/2018 |
| RU | 2692666 C1 | 6/2019 |
| RU | 2695629 C1 | 7/2019 |
| RU | 2710058 C2 | 12/2019 |
| RU | 2726468 C1 | 7/2020 |
| WO | 9958047 A1 | 11/1999 |
| WO | 0137769 A1 | 5/2001 |
| WO | 0195791 A1 | 12/2001 |
| WO | 2007059189 A2 | 5/2007 |
| WO | 2009033110 A2 | 3/2009 |
| WO | 2009036104 A2 | 3/2009 |
| WO | 2009039315 A2 | 3/2009 |
| WO | 2009059400 A1 | 5/2009 |
| WO | 2010117386 A1 | 10/2010 |
| WO | 2014053824 A1 | 4/2014 |
| WO | 2015131135 A1 | 9/2015 |
| WO | 2015171793 A1 | 11/2015 |
| WO | 2016033590 A1 | 3/2016 |
| WO | 2017062673 A1 | 4/2017 |
| WO | 2017196306 A1 | 11/2017 |
| WO | 2017205857 A1 | 11/2017 |
| WO | 2020074532 A1 | 4/2020 |
| WO | 2020180729 A1 | 9/2020 |
| WO | 2020215359 A1 | 10/2020 |
| WO | 2020216763 A1 | 10/2020 |
| WO | 2020257711 A1 | 12/2020 |
| WO | 2021023799 A1 | 2/2021 |
| WO | 2021049243 A1 | 3/2021 |
| WO | 2021066047 A1 | 4/2021 |
| WO | 2021092211 A1 | 5/2021 |
| WO | 2021183637 A1 | 9/2021 |
| WO | 2022149028 A1 | 7/2022 |

(56) References Cited

FOREIGN PATENT DOCUMENTS

| WO | 2023089416 A1 | 5/2023 |
|---|---|---|
| WO | 2023089459 A1 | 5/2023 |
| WO | 2023097391 A1 | 6/2023 |

OTHER PUBLICATIONS

Fischer et al., "Scanning Laser Ophthalmoscopy (SLO)", In: Bille JF, editor. High Resolution Imaging in Microscopy and Ophthalmology: New Frontiers in Biomedical Optics [Internet], Aug. 14, 2019, accessed on Jan. 30, 2023 from https://www.ncbi.nlm.nih.gov/books/NBK554043, Springer.
Ginner et al., "Wide-Field OCT Angiography at 400 KHz Utilizing Spectral Splitting", Photonics, Oct. 23, 2014, pp. 369-379, vol. 1, No. 4.
Heidelberg Engineering GMBH, "Spectralis. Hardware Operating Instructions," Version 001, Aug. 2007.
Heidelberg Engineering, "Spectralis. Multimodal Imaging Platform Optimized for the Posterior Segment", accessed on Jan. 30, 2023 from https://business-lounge.heidelbergengineering.com/us/en/products/spectralis/spectralis/.
Hofer et al., "Dispersion encoded full range frequency domain optical coherence tomography", Jan. 5, 2009, pp. 7-24, vol. 17, No. 1, Optics Express, US.
Hofer et al., "Fast dispersion encoded full range optical coherence tomography for retinal imaging at 800 nm and 1060 nm", Mar. 1, 2010, pp. 4898-4919, vol. 18, No. 5, Optics Express.
Leitgeb et al., "Complex ambiguity-free Fourier domain optical coherence tomography through transverse scanning", 2007, pp. 3453-3455, vol. 32, Optics Letters.
Li et al., "DMD-based three-dimensional chromatic confocal microscopy", 2020, pp. 4349-4356, vol. 59, No. 14, Applied Optics.
Martial et al., "Programmable Illumination and High-Speed, Multi-Wavelength, Confocal Microscopy Using a Digital Micromirror", Aug. 2012, e43942, vol. 7, No. 8, PLOS One.
Reznicek Lukas et al., "Wide-Field Megahertz OCT Imaging of Patients with Diabetic Retinopathy", Journal of Diabetes Research, 2015, 5 pages.
Ruggeri et al., "Imaging and full-length biometry of the eye during accommodation using spectral domain OCT with an optical switch", Jul. 1, 2012, pp. 1506-1520, vol. 3, No. 7, Biomedical Optics Express.
Sarunic et al., "Instantaneous complex conjugate resolved spectral domain and swept-source OCT using 3x3 fiber couplers", Feb. 2005, pp. 957-967, vol. 13, No. 3, Optics Express.
Shields et al., "Wide-angle Imaging of the Ocular Fundus", Review of the Ophthalmology, Feb. 15, 2003.
Singh, "Lasers Take Aim At Floaters", Ophthalmology Management, Jul. 1, 2019, pp. 38, 40-42, 59, vol. 23.
Singh, "Modern vitreolysis—YAG laser treatment now a real solution for the treatment of symptomatic floaters", Survey of Ophthalmology, Mar. 3, 2020, pp. 581-591, vol. 65, No. 5.
SunLED, NanoPoint-0201 Series LEDs, published Feb. 15, 2016, www.SunLEDusa.com.
Volk Optical, "Volk Idrees Mid-Vitreous Lens", Dec. 20, 2020, accessed on Dec. 20, 2020 from https://www.volk.com/...s?pr_prod_strat=collection_fallback&pr_rec_pid=4513049018402&pr_ref_pid=4513048952866&pr_seq=uniform.
Volk Optical, "Volk Singh Mid-Vitreous Lens", Dec. 20, 2020, accessed on Dec. 20, 2020 from https://www.volk.com/products/singh-mid-vitreous-vitreous-slit-lamp-lens?_pos=3&amp;amp;_sid=b50c0674f&amp;amp;_ss=r.
Wang et al., "In vivo full range complex Fourier domain optical coherence tomography", Jan. 30, 2007, 054103, vol. 90, Applied Physics Letters.
Wojtkowski et al., "Full range complex spectral optical coherence tomography technique in eye imaging", 2002, pp. 1415-1417, vol. 27, No. 16, Optics Letters.
Yasuno et al., "Simultaneous B—M-mode scanning method for real-time full-range Fourier domain optical coherence tomography", 2006, pp. 1861-1865, vol. 45, No. 8, Applied Optics.
Zhang et al., Removal of a mirror image and enhancement of the signal-to-noise ratio in Fourier-domain optical coherence tomography using an electro-optic phase modulator, Jan. 15, 2005, vol. 30, No. 2, Optics Letters.
Zhou et al., "Dual channel dual focus optical coherence tomography for imaging accommodation of the eye", May 25, 2009, pp. 8947-8955, vol. 17, No. 11, Optics Express.
Blake F. Webb, et al.; "Prevalence of vitreous floaters in a community sample of smartphone users"; Internat'l Journal of Ophthalmology; Jun. 18, 2013; pp. 402-405; 6(3); PMC/ US National Library of Medicine National Institutes of Health.
Chirag P. Shah, et al., YAG Laser Vitreolysis vs Sham YAG Vitreolysis for Symptomatic Vitreous Floaters A Randomized Clinical Trial, JAMA Ophthalmology, Sep. 2017, 918-923, 135-9.
Ellex Website, Treatment Guidelines—Laser Floater Removal; 2016, Ellex Medical Pty Ltd. E&OE. VB0002E, downloaded Apr. 20, 2017.
Felix Sauvage et al: "Photoablation of Human Vitreous Opacities by Light-Induced Vapor Nanobubbles", ACS Nano, vol. 13, No. 7, Jul. 9, 2019, pp. 8401-8416.
Kim Jihwan et al. "Nonmechanical Laser Beam Steering Based on Polymer Polarization Gratings: Design Optimization and Demonstration", Journal of Lightwave Technology, vol. 33, No. 10, pp. 2068-2077, May 15, 2015.
Michael J. Escuti, et al., "Geometric-Phase Holograms", Optics & Photonics News, pp. 22-29, Feb. 2016.
Milston Rebecca et al: "Vitreous floaters: Etiology, diagnostics, and management", Survey of Ophthalmology, vol. 61, No. 2, Mar. 1, 2016, pp. 211-227.
Nicusor Iftimia et al: "Hybrid retinal imaginer using line-scanning laser ophthalmoscopy and spectral domain optical coherence tomography", Optics Express, vol. 14, No. 26, Dec. 22, 2006.
Reece Bergstrom, et al., Vitreous Floaters, National Center for Biotechnology Information, May 21, 2020, 4 pages, Bookshelf ID NBK470420, StatPearls Publishing LLC, online.
Wikipedia Encyclopedia, Floater, Wikipedia Encyclopedia, Mar. 29, 2021, online: https://en.wikipedia.org/wiki/floater?wprov=sfti 1.
Zhang Yunbo et al: "Parallel large-range scanning confocal microscope based on a digital micromirror device", Optik vol. 124, No. 13 (2013), Aug. 4, 2012, pp. 1585-1588.
Adrian G.H. Podoleanu et al., Combined optical coherence tomograph and scanning laser ophthalmoscope mi nije dostupan besplatno., Electronics Letters, 34 (11), 1998.
Chi-Hung Lee, et al., Imaging vitreous floaters and cataracts with optical simulations, Optik, 194, 1-9, 2019.
Christy K. Sheehy et al., High-speed, image-based eye tracking with a scanning laser ophthalmoscope, Biomedical Optics Express, vol. 3, No. 10, 2012.
D. H. Kelly, "Retinal Inhomogeneity. II. Spatial Summation," J. Opt. Soc. Am., pp. 114-119, vol. 1, No. 1 (Jan. 1984).
D. H. Kelly, "Retinal Inhomogeneity. III. Circular-Retina Theory," D.H. Kelly, J. Opt. Soc. Am., pp. 810-819, vol. 2, No. 6 (Jun. 1985).
D.H. Kelly, "Visual Processing of Moving Stimuli," J. Opt. Soc. Am., pp. 216-225, vol. 2, No. 2 (Feb. 1985).
D.H. Kelly,, "Motion and Vision. II. Stabilized Spatio-Temporal Threshold Surface," J. Opt. Soc. Am., pp. 1340-1349, vol. 69, No. 10 (Oct. 1979).
D.H.Kelly, "Retinal Inhomogeneity. I. Spatiotemporal Contrast Sensitivity," J. Opt. Sec. Am., pp. 107-113, vol. 1, No. 1 (Jan. 1984).
Mojana F. et al.. Observations by spectral-domain optical coherence tomography combined with simultaneous scanning laser ophthalmoscopy: imaging of the vitreous, American Journal of Ophthalmol. Apr. 2010; 149(4):641-650.
Peter G. J. Barten, "Contrast Sensitivity of the Human Eye and its Effects on Image Quality," Chapter 3, pp. 27-40, Model for the spatial contrast sensitivity of the eye, (1999).
Pointer, J. S., & Hess, R. F. "The contrast sensitivity gradient across the human visual field: With emphasis on the low spatial frequency range,", R. F. Vision Research, 29(9), 1133-1151 (1989).
Sebag J et al., Vitreous and Vitreoretinal Interface, Ch. 21, 2015.

(56) References Cited

OTHER PUBLICATIONS

Sebag J., Vitreous and Vision Degrading Myodesopsia. Progress in Retinal and Eye Research Nov. 2020;79.

T Ivanova et al, Vitrectomy for primary symptomatic vitreous opacities: an evidence-based review, Eye (Lond) May 2016;30(5):645-55.

Teri T Kleinberg et al., Vitreous substitutes: a comprehensive review, Survey of Ophthalmology, 56 (4), 2011.

* cited by examiner

OPTICAL COHERENCE TOMOGRAPHY SYSTEM WITH AN EXTENDED DEPTH RANGE

PRIORITY CLAIM

This application claims the benefit of priority of U.S. Provisional Patent Application Ser. No. 63/281,531, titled "OPTICAL COHERENCE TOMOGRAPHY SYSTEM WITH AN EXTEDED DEPTH RANGE" filed on Nov. 19, 2021, which is hereby incorporated by reference in its entirety as though fully and completely set forth herein.

TECHNICAL FIELD

The present disclosure relates generally to imaging systems, and more particularly to an optical coherence tomography (OCT) system with an extended depth range.

BACKGROUND

Optical coherence tomography (OCT) is an imaging technique used to generate images of a sample, such as the interior of an eye during, e.g., a laser vitreolysis procedure. An OCT device sends light along a sample arm to the eye and a reference arm. The combination of light reflected from the sample and reference arms yields an interference pattern. In some systems, the reference arm is controlled to gather image information from different depths of the eye.

Known OCT devices, however, have limited imaging depths. The approaches for addressing this limitation either require trade-offs with imaging performance (e.g., speed) or use complex designs or components that can significantly increase the overall cost and complexity of the system.

BRIEF SUMMARY

In certain embodiments, an optical coherence tomography (OCT) system includes a light source, a beamsplitter, optical elements, a reference arm system, a detector, and a computer. The light source provides a light beam. The beamsplitter splits the light beam into a sample beam and a reference beam. Optical elements direct the sample beam along a sample path towards a sample, which reflects the sample beam to yield a reflected sample beam. The sample path comprises sample path ranges. The reference arm system directs the reference beam through each reference arm of a plurality of reference arms to yield a reflected reference beam. Each reference arm corresponds to a sample path range. Each reference arm is associated with a specific dispersion level with a corresponding dispersion compensation parameter set designed to address the specific dispersion level. The detector detects the reflected sample beam and the reflected reference beam, and generates a detector signal in response to detecting the reflected sample beam and the reflected reference beam. The computer performs the following for each sample path range to yield image information for the sample path ranges: select the dispersion compensation parameter set corresponding to the reference arm of the sample path range; apply the dispersion compensation parameter set to the detector signal to yield image information; and process the image information to yield image information for the sample path range. The computer generates an image of the sample from the image information for the sample path ranges.

Embodiments may include none, one, some, or all of the following features:

The computer processes the image information by performing the following until an image quality satisfies an image quality criterion: perform image processing on the image information; generate a candidate image from the image information; and evaluate the image quality of the candidate image.

The detector signal comprises interference signals, where each interference signal corresponds to a reference arm of the plurality of reference arms.

The sample is within an eye.

The reference arms have reference planes including a first reference plane and a second reference plane. In an example, the axial separation between the first and second reference planes is substantially twice an OCT imaging depth minus an overlap (if any) between the planes. The first reference plane covers a positive OCT image space, and the second reference plane covers a negative OCT image space to yield an image that is substantially twice the OCT imaging depth minus the overlap between the planes. In another example, the axial separation between the first and second reference planes is substantially an OCT imaging depth minus an overlap (if any) between the planes. The first and second reference planes each cover a positive OCT image space to yield an image that is substantially twice the OCT imaging depth minus the overlap between the planes.

A first reference arm has dispersion material.

A first reference arm has dispersion material that creates a first dispersion mismatch. A second reference arm has dispersion material that creates a second dispersion mismatch different from the first dispersion mismatch.

In certain embodiments, a method for generating an image with an optical coherence tomography (OCT) system includes providing a light beam. The light beam is split into a sample beam and a reference beam. The sample beam is directed along a sample path (with multiple sample path ranges) towards a sample, which reflects the sample beam to yield a reflected sample beam. The reference beam is directed through each reference arm of multiple reference arms of a reference arm system to yield a reflected reference beam. Each reference arm corresponds to a sample path range and is associated with a specific dispersion level with a corresponding dispersion compensation parameter set. The dispersion compensation parameter set designed to address the specific dispersion level. The reflected sample beam and the reflected reference beam are detected by a detector, which generates a detector signal in response to detecting the reflected sample beam and the reflected reference beam. The following is performed by a computer for each sample path range to yield image information for the sample path ranges: selecting the dispersion compensation parameter set corresponding to the reference arm of the sample path range; applying the dispersion compensation parameter set to the detector signal to yield image information; and processing the image information to yield image information for the sample path range. An image of the sample is generated from the image information for the sample path ranges.

Embodiments may include none, one, some, or all of the following features:

The processing the image information to yield image information for the sample path range corresponding to the reference arm includes performing the following until an image quality satisfies an image quality criterion: performing image processing on the image information; generating a candidate image from the image information; and evaluating the image quality of the candidate image.

The detector signal comprises interference signals, where each interference signal corresponds to a reference arm of the plurality of reference arms.

The sample is within an eye.

The reference arms have reference planes including a first reference plane and a second reference plane. In an example, the axial separation between the first and second reference planes is substantially twice an OCT imaging depth minus an overlap (if any) between the planes. The first reference plane covers a positive OCT image space, and the second reference plane covers a negative OCT image space to yield an image that is substantially twice the OCT imaging depth minus the overlap between the planes. In another example, the axial separation between the first and second reference planes is substantially an OCT imaging depth minus an overlap (if any) between the planes. The first and second reference planes each cover a positive OCT image space to yield an image that is substantially twice the OCT imaging depth minus the overlap between the planes.

A first reference arm has dispersion material.

A first reference arm has dispersion material that creates a first dispersion mismatch. A second reference arm has dispersion material that creates a second dispersion mismatch different from the first dispersion mismatch.

In certain embodiments, an optical coherence tomography (OCT) system includes a light source, a beamsplitter, optical elements, a reference arm system, a detector, and a computer. The light source provides a light beam. The beamsplitter splits the light beam into a sample beam and a reference beam. Optical elements direct the sample beam along a sample path towards a sample, which reflects the sample beam to yield a reflected sample beam. The sample path comprises sample path ranges. The reference arm system directs the reference beam through each reference arm of a plurality of reference arms to yield a reflected reference beam. Each reference arm corresponds to a sample path range. Each reference arm is associated with a specific dispersion level with a corresponding dispersion compensation parameter set designed to address the specific dispersion level. The detector detects the reflected sample beam and the reflected reference beam, and generates a detector signal in response to detecting the reflected sample beam and the reflected reference beam. The computer performs the following for each sample path range to yield image information for the sample path ranges: select the dispersion compensation parameter set corresponding to the reference arm of the sample path range; apply the dispersion compensation parameter set to the detector signal to yield image information; and process the image information to yield image information for the sample path range. The computer processes the image information by performing the following until an image quality satisfies an image quality criterion: perform image processing on the image information; generate a candidate image from the image information; and evaluate the image quality of the candidate image. The computer generates an image of the sample from the image information for the sample path ranges. In some embodiments, the reference arms have reference planes including a first reference plane and a second reference plane. In an example, the axial separation between the first and second reference planes is substantially twice an OCT imaging depth minus an overlap (if any) between the planes. The first reference plane covers a positive OCT image space, and the second reference plane covers a negative OCT image space to yield an image that is substantially twice the OCT imaging depth minus the overlap between the planes. In another example, the axial separation between the first and second reference planes is substantially an OCT imaging depth minus an overlap (if any) between the planes. The first and second reference planes each cover a positive OCT image space to yield an image that is substantially twice the OCT imaging depth minus the overlap between the planes.

DESCRIPTION OF EXAMPLE EMBODIMENTS

Figure 1:
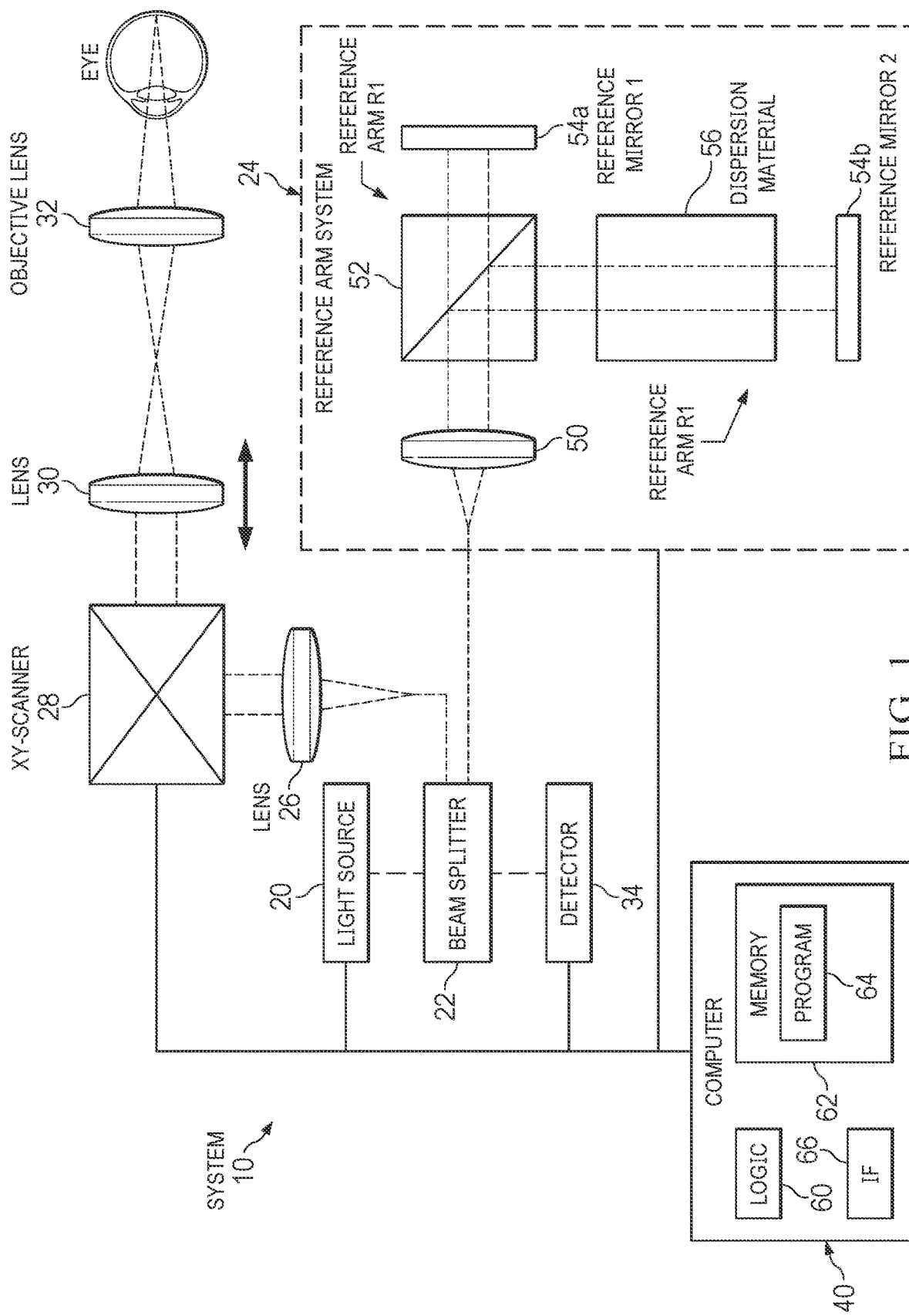
FIG. 1 illustrates an example of an optical coherence tomography (OCT) system that can generate images of the interior of an eye, according to certain embodiments.

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Known optical coherence tomography (OCT) devices have limited imaging depths. Accordingly, OCT systems described herein includes a reference arm system with multiple reference arms that provide multiple reference signals. Each reference signal covers a different depth range in the sample, so the multiple signals provide extended depth coverage. In known devices with multiple reference arms, however, the multiple reference signals provide image data from multiple reference planes, which could yield multiple superimposed images that degrade image quality. Hence, to improve image quality, the reference arms of the systems herein have differential dispersion properties that can be used to separate the images. Each reference arm has a particular dispersion mismatch relative to the sample arm, which is compensated for with particular dispersion compensation parameters. Accordingly, different dispersion compensation parameters can be applied to the image data to generate an image for a particular reference arm and the corresponding depth range in the sample.

The OCT systems described herein provide several advantages for ophthalmic procedures. For example, the extended depth imaging can show the retina and floater in the same image, so the spatial coordinates of the floater and proximity of the floater to the retina can be determined. This allows the surgeon for laser procedures such as laser vitreolysis to check that the floater is not too close to the retina and to direct the beam to the floater coordinates. As another example, the design is relatively simple and does not require additional electro-optical components, so does not add to the system cost or complexity. As yet another example, the images of different regions can be acquired concurrently and separated during post-processing, so the image acquisition is relatively robust against various motion-related artifacts.

FIG. 1 illustrates an example of an optical coherence tomography (OCT) system 10 that can generate images of the interior of an eye, according to certain embodiments. OCT system 10 utilizes multiple reference arms and dispersion compensation to provide extended depth imaging. Multiple reference arms yield image information from different sample depths. Each reference arm has a particular dispersion mismatch relative to the sample arm, which is compensated for with corresponding dispersion compensation parameters. The dispersion compensation parameters are applied to the image data from the corresponding reference arm to yield image data for the associated sample depth. Image data from the different sample depths are joined together to yield an extended image.

In general, OCT dispersion mismatch results from the different optical path lengths of the reference arm and sample arm paths for different wavelengths. To address this, dispersion compensation parameters are used to apply a corrective dispersive phase to obtain clearer, higher contrast images. As an example of dispersion compensation parameters, consider a simple example of an interferometric setup with a beam splitter that splits and directs light towards reference and sample arms. At the reference arm, light travels through a free-space medium and is reflected by a mirror located at a physical distance of $Z_R$ from the beam splitter. At the sample arm, light travels through a dispersive element with refractive index $n(\omega)$ and physical thickness of $Z_D$ and is reflected by a sample located at a physical distance of $Z_S$ from the beam splitter with a power reflectivity $R_S$. The beam splitter receives and recombines the light reflected from the reference and sample arms.

The recombined light can be used to generate an interferometric OCT signal. The interferometric OCT signal can be approximated as $\sim 2\text{Re}\{E_S(\omega)E^*_R(\omega)\}$, where $E_S(\omega)$ and $E_R(\omega)$ represent the electric field signals from the sample and reference arms, respectively. The electric field signals $E_R(\omega)$ and $E_S(\omega)$ may be expressed as:

$$E_R(\omega) = \sqrt{\frac{I_0}{2}} \cdot e^{i\frac{\omega 2 Z_R}{c_0}}$$

$$E_S(\omega) = \sqrt{\frac{R_S I_0}{2}} \cdot e^{i\frac{\omega 2 Z_S}{c_0}} \cdot e^{i\frac{\omega(n(\omega)-1)2Z_D}{c_0}}$$

Correspondingly, the interference signal $I(\omega)$ of the fields is proportional to:

$$I(\omega) = \frac{I_0 \sqrt{R_S}}{2} \text{Re}\left\{ e^{i\frac{\omega 2(Z_S - Z_R)}{c_0}} \cdot e^{i\frac{\omega(n(\omega)-1)2Z_D}{c_0}} \right\} =$$

$$\frac{I_0 \sqrt{R_S}}{2} \text{Re}\left\{ e^{i\frac{\omega 2(Z_S - Z_R)}{c_0}} \cdot e^{i\varphi_{Disp}(\omega)} \right\}$$

The dispersive phase $\varphi_{Disp}(\omega)$ represents the dispersive phase effect due to chromatic dispersion:

$$\varphi_{Disp}(\omega) = (k(\omega) - k_0) \cdot 2 Z_D$$

Using the Taylor series expansion of angular frequency dependent wavenumber, the dispersive phase can be represented as:

$$\varphi_{Disp}(\omega) = (c_1 \omega + c_2 \omega^2 + c_3 \omega^3 \ldots) \cdot 2 Z_D$$

In the example, the dispersion compensation parameters $c_1$, $c_2$, etc. can be used to perform dispersive phase correction in OCT signal processing.

Turning to an example embodiment, an eye has a z-axis (e.g., a visual or optical axis). OCT system 20 has reference arms R1 and R2 used to image z-ranges Z1 and Z2, respectively, relative to (e.g., on or parallel to) the z-axis. Dispersion compensation parameters D calibrate the sample and reference signals, e.g., dispersion compensation parameters D1 calibrate sample and reference arm R1 signals, and dispersion compensation parameters D2 calibrate sample and reference arm R2 signals. When dispersion compensation parameters D1 are applied, reference arm R1 signal yields a clearer, higher contrast image, and reference arm R2 yields a blurrier, lower contrast image. Iterative image processing is performed on the image data to separate the images until a desired image quality is achieved. Any suitable image quality metric may be used to determine the sharpness or blurriness of an image, e.g., analysis of peak signal levels, sharpness or blur metrics, or 2D Fourier transforms of the images. The resulting image is used for z-range Z1. Analogous steps are performed with dispersion compensation parameters D2 to yield an image for z-range Z2.

In the illustrated example, OCT system 10 includes a light source 20, a splitter 22, reference arm system 24, a lens 26, an xy-scanner 28, a lens 30, an objective lens 32, a detector 34, and a computer 40, coupled as shown. Reference arm system 24 includes a lens 50, reference arms R1 and R2, a beamsplitter 52, mirrors 54 (54a, 54b), and dispersion material 56. Computer includes logic 60, a memory 62 (which stores one or more computer programs 64), and an interface (IF) 66.

As an overview of operation, light source 20 provides a light beam. Beamsplitter 22 splits the light beam into a sample beam and a reference beam. Optical elements (e.g., lens 26, xy-scanner 28, lens 30, objective lens 32) direct the sample beam towards an eye, which reflects the light to yield a reflected sample beam. Reference arm system 24 directs the reference beam along each reference arm of multiple reference arms to yield a reflected reference beam. Each reference arm corresponds to a sample path range of multiple sample path ranges of the sample. Also, each reference arm has a specific dispersion level and a corresponding dispersion compensation parameter set designed to address the specific dispersion level.

Continuing with the example of operation, detector 34 detects the reflected sample beam and the reflected reference beam, and generates a detector signal in response to detecting the beams. Computer 40 performs the following for each sample path range to yield image information for the sample: select the dispersion compensation parameter set of the reference arm corresponding to the sample path range; apply the dispersion compensation parameter set to the detector signal to yield image information; and process the image information to yield image information for the sample path range. Computer 40 then generates an image of the sample from the image information for the sample path ranges.

Turning to the components, OCT system 10 may include any suitable OCT technology, e.g., a Fourier domain type (such as a swept source, spectral domain, or line-field type) that utilizes a fast Fourier transform (FFT) of the interference signal. Light source 20 may be a variable wavelength light source that changes the wavelength of the emitted light. Light source 20 provides light for the interferometer beam. Examples of light source 20 include a super-luminescent diode or swept-source laser. For example, light source 20 may be super-luminescent diode that provides light with an 850 nm wavelength, a greater than 7 nm spectral bandwidth, and a z-resolution of approximately 50 um.

Beamsplitter 22 splits the light beam into a sample beam and a reference beam, and may comprise any suitable beamsplitter, such as a dichroic mirror. Optical elements (e.g., lens 26, xy-scanner 28, lens 30, objective lens 32) direct the sample beam towards an eye. In general, an optical element can act on (e.g., transmit, reflect, refract, diffract, collimate, condition, shape, focus, modulate, and/or otherwise act on) a laser beam. Examples of optical elements include a lens, prism, mirror, diffractive optical element (DOE), holographic optical element (HOE), and spatial light modulator (SLM).

In the example, lens 26 collimates beams. Xy-scanner 28 scans beams transversely in xy-directions. Examples of scanners include a galvo scanner (e.g., a pair of galvanometrically-actuated scanner mirrors that can be tilted about mutually perpendicular axes), an electro-optical scanner (e.g., an electro-optical crystal scanner) that can electro-optically steer the beam, or an acousto-optical scanner (e.g., an acousto-optical crystal scanner) that can acousto-optically steer the beam. Lens 30 and objective lens 32 collimate and focus beams towards the eye.

The sample beam penetrates the eye in the z-direction and is reflected by the interior of the eye. The reflected sample beam provides information about the internal portion in the z-direction. For example, the sample beam may indicate the location of the surfaces, e.g., the anterior and/or posterior surfaces, of a floater, the lens (natural or intraocular lens (IOL)), and/or the retina.

Reference arm system 24 includes any suitable number of reference arms R (R1, R2) that have different optical paths bounded by reference mirrors 54 (54a and 54b, respectively). Each reference arm is used to scan a different z-range of the eye. The z-ranges may overlap slightly, e.g., 5 millimeters (mm) or less such as 1 mm or less, to facilitate fusion of adjacent images to obtain continuous imaging. The arrange of the reference arms may have any suitable optical path difference between the reference arms, as described in more detail with reference to FIGS. 2A and 2B.

Each reference arm has its own dispersion mismatch relative to the sample arm. In certain embodiments, dispersion material 56 creates dispersion in one or more arms to yield the different dispersion mismatches for different arms. Any suitable dispersion material 56 may be used, such as a dispersive prism, grating, fiber-stretcher, or dispersion glass (e.g., BK7, which is a pure optical borosilicate-crown glass material). The same or different dispersion material 56 may be used for the reference arms. Beamsplitter 52 directs the beam to the arm R for a particular z-range, and may switch between arms in, e.g., less than 5 millisecond (ms), such as approximately one ms.

Detector 34 detects the reflected sample and reference beams, which form interference signals. Detector 34 aggregates the photon reflections in the z-direction to yield an A-scan, i.e., the reflection intensity distribution of the sample light in the z-direction. Multiple A-scans may be performed in another direction (e.g., the x- or y-direction) to generate multiple adjacent A-scans, which may be compiled into a B-scan. A-scans may be performed at any suitable rate, e.g., once every 10 to 30 ms, such as every approximately 20 ms, to determine the z-location of a target such as a floater. Examples of detector 34 include a high-resolution spectrometer or fast interferometer diode.

Computer 40 sends instructions to components of system 10 and performs image processing to generate images of a sample. For example, computer 40 instructs the components to send sample and reference signals and to detect the reflected signals. Computer 40 then applies dispersion compensation parameter sets to the detected signals to generate images of different z-ranges of an eye and joins the images together to yield an image of the length of the eye.

Figure 2A:
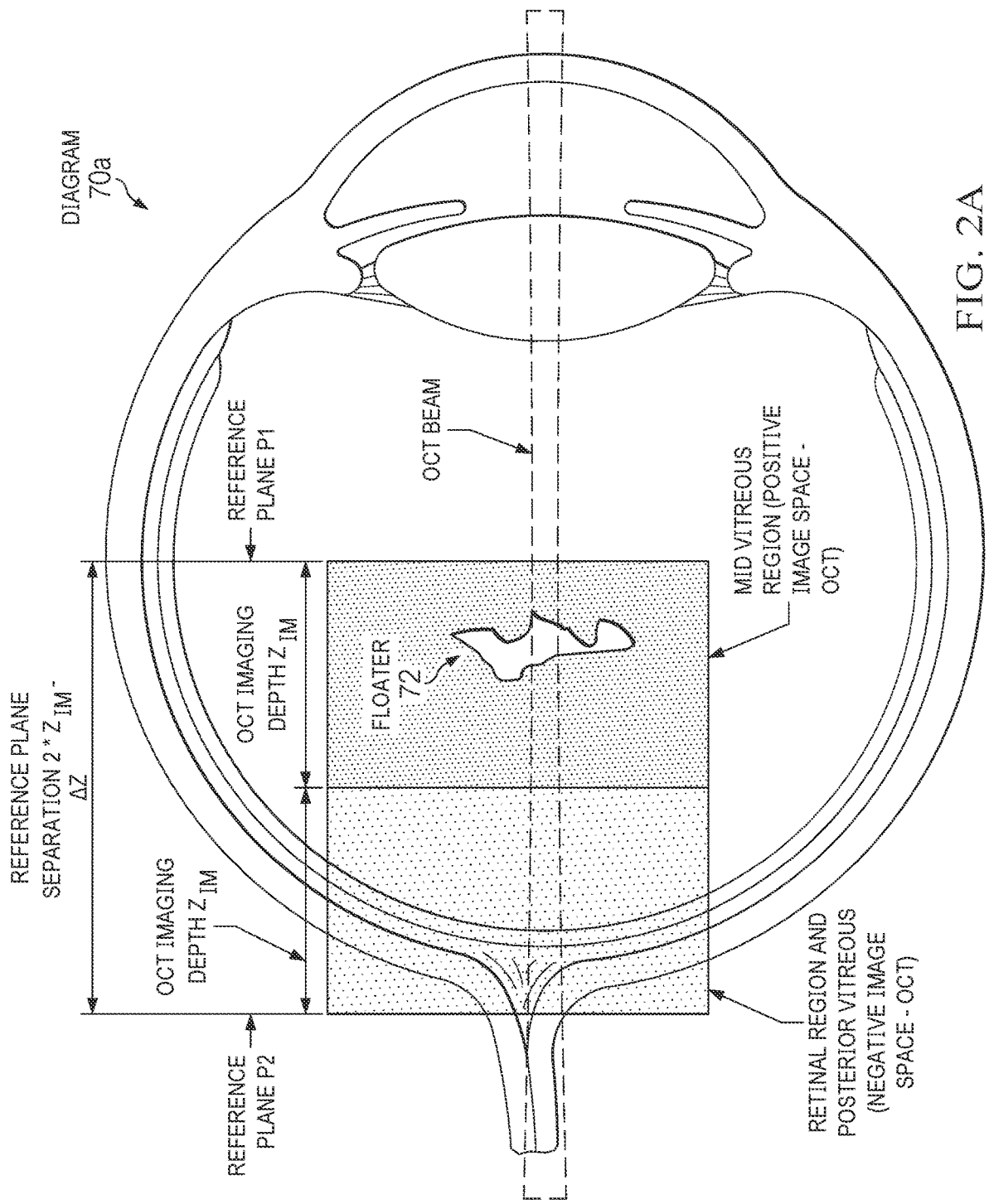
FIGS. 2A and 2B are diagrams of examples of the relative placement of OCT reference planes of reference arms for extended depth coverage for imaging retinal and vitreous regions.
Figure 2B:
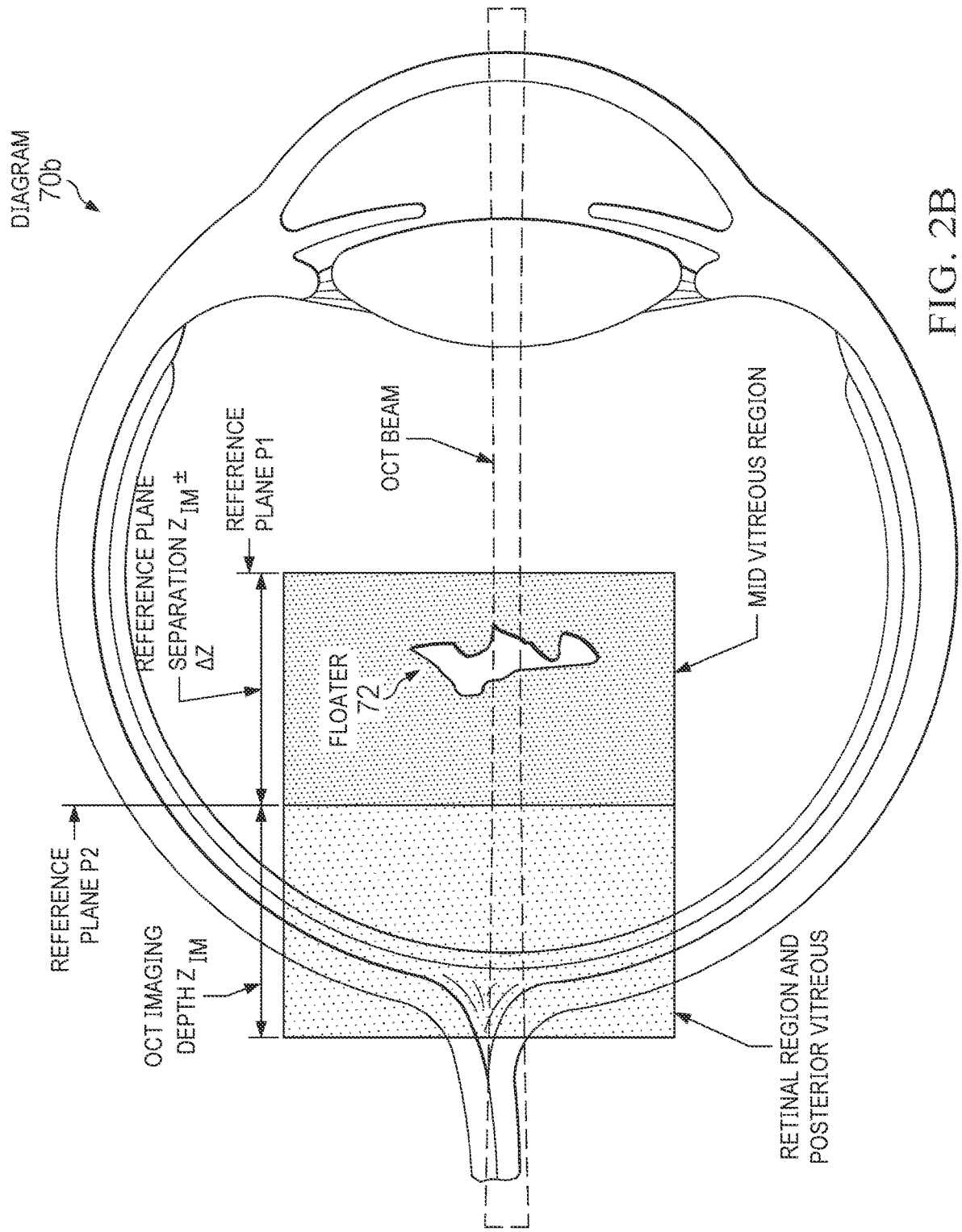

FIGS. 2A and 2B are diagrams 70 (70a and 70 b, respectively) of examples of the relative placement of OCT reference planes P1 and P2 of reference arms for extended depth coverage for imaging retinal and vitreous regions. In some applications, e.g., laser vitreolysis for removing floaters 72, a laser beam is directed to a target, e.g., a floater 72. The target should be sufficiently far from the retina such that the laser beam does not overexpose the retina. Extended depth imaging can show the retina and floater 72 in the same image to determine the proximity of the floater 72 to the retina. In the examples, placement of reference planes P1 and P2 extends the original OCT imaging depth $Z_{IM}$ to cover mid-vitreous and posterior vitreous/retinal regions.

FIG. 2A illustrates an example of the relative placement of reference planes P1 and P2. In the example, the axial separation between reference planes P1 and P2 is approximately twice the imaging depth $Z_{IM}$ of the OCT system minus overlap $\Delta Z$ (if any) between the planes, or $2*Z_{IM}-\Delta Z$. Reference plane P1 covers a positive OCT image space and reference plane P2 covers a negative OCT image space to yield an image across the mid-vitreous and posterior vitreous/retinal regions with an imaging depth of $2*Z_{IM}-\Delta Z$.

FIG. 2B illustrates another example of the relative placement of reference planes P1 and P2. In the example, the axial separation between reference planes P1 and P2 is approximately the imaging depth of the OCT system $Z_{IM}$ minus overlap $\Delta Z$ (if any) between the planes, or $Z_{IM}-\Delta Z$. Reference planes P1 and P2 cover positive OCT image spaces to yield an image across the mid-vitreous and posterior vitreous/retinal regions with an imaging depth of $2*Z_{IM}-\Delta Z$.

Figure 3:
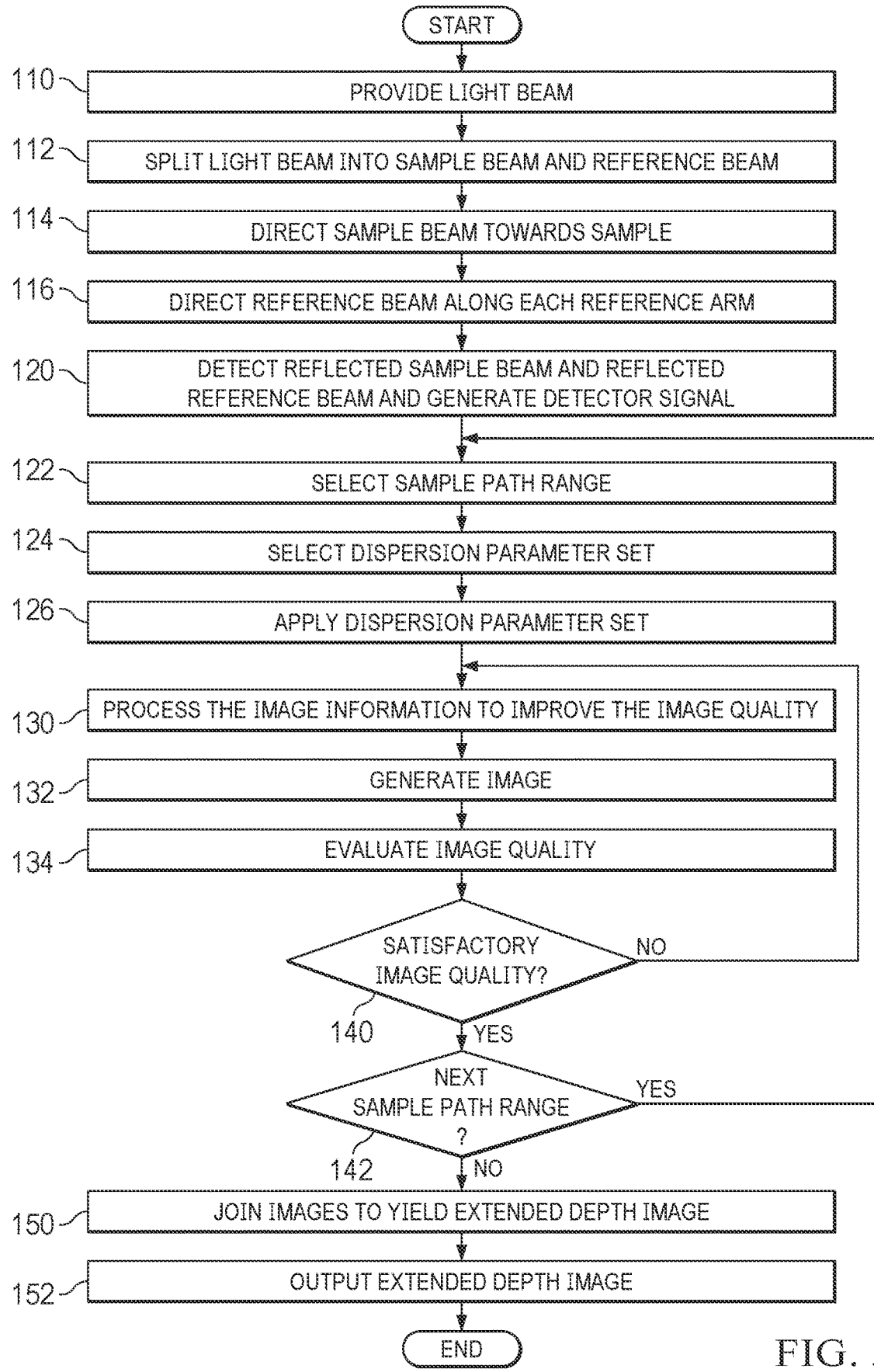
FIG. 3 illustrates an example of a method for imaging a sample and creating extended depth image, according to certain embodiments.

FIG. 3 illustrates an example of a method for imaging a sample and creating an extended depth image, according to certain embodiments. The method starts at step 110, where a light source provides a light beam. A beamsplitter splits the light beam into a sample beam and a reference beam at step 112. Optical elements direct the sample beam towards the sample at step 114. The sample reflects the sample light to yield a reflected sample beam.

A reference arm system directs the reference beam along each reference arm of a plurality of reference arms at step 116 to yield a reflected reference beam for each arm. Each reference arm corresponds to a sample path range of the sample. Each reference arm is also associated with a specific dispersion level and an associated dispersion compensation parameter set, where the dispersion compensation parameter set addresses the specific dispersion level. A detector detects the reflected sample beam and reference beam and generates a detector signal comprising interference information at step 120.

A computer gathers image information for the sample path ranges from the detector signal at steps 122 to 134. A sample path range is selected at step 122. The computer selects the dispersion compensation parameter set of the reference arm corresponding to the sample path range at step 124. The computer applies the dispersion compensation parameter set to the detector signal at step 126 to yield image information for the sample path range. The computer processes the image information to improve image quality at step 130. An image is generated at step 132, and image quality of the image is evaluated at step 134. The image quality may be satisfactory at step 142. If the image quality is not satisfactory, the method returns to step 130 to process the image information to improve image quality. If the image quality is satisfactory, the method proceeds to step 142.

There may be a next sample path range to consider at step 142. If there is a next range, the method returns to step 122 to select the next range. If there is no next range, the method proceeds to step 150. The computer joins the images for the sample path ranges to generate an extended depth image of the sample at step 150. The computer outputs the extended depth image (e.g., on a display) at step 152.

A component (such as the control computer) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An optical coherence tomography (OCT) system, comprising:
    a light source configured to provide a light beam;
    a beamsplitter configured to split the light beam into a sample beam and a reference beam;
    one or more optical elements configured to direct the sample beam along a sample path towards a sample, the sample path comprising a plurality of sample path ranges, the sample reflecting the sample beam to yield a reflected sample beam;
    a reference arm system configured to direct the reference beam through each reference arm of a plurality of reference arms to yield a reflected reference beam, each reference arm corresponding to a sample path range of the plurality of sample path ranges, each reference arm associated with a specific dispersion level with a corresponding dispersion compensation parameter set, the dispersion compensation parameter set designed to address the specific dispersion level;
    a detector configured to:
        detect the reflected sample beam and the reflected reference beam; and
        generate a detector signal in response to detecting the reflected sample beam and the reflected reference beam; and
    a computer configured to:
        perform the following for each sample path range of the plurality of sample path ranges to yield image information for the sample path ranges:
            select the dispersion compensation parameter set corresponding to the reference arm of the sample path range;
            apply the dispersion compensation parameter set to the detector signal to yield image information; and
            process the image information to yield image information for the sample path range; and
        generate an image of the sample from the image information for the plurality of sample path ranges, the image being generated based on image information that is processed with a plurality of dispersion compensation parameter sets that correspond to the plurality of sample path ranges.

2. The OCT system of claim 1, the computer configured to process the image information to yield image information for the sample path range by performing the following until an image quality satisfies an image quality criterion:
    perform image processing on the image information;
    generate a candidate image from the image information; and
    evaluate the image quality of the candidate image.

3. The OCT system of claim 1, the detector signal comprising a plurality of interference signals, each interference signal corresponding to a reference arm of the plurality of reference arms.

4. The OCT system of claim 1, the sample comprising a sample within an eye.

5. The OCT system of claim 1, the plurality of reference arms having a plurality of reference planes comprising a first reference plane and a second reference plane.

6. The OCT system of claim 5, wherein:
an axial separation between the first reference plane and the second reference plane is substantially twice an OCT imaging depth minus any overlap between the planes; and
the first reference plane covers a positive OCT image space and the second reference plane covers a negative OCT image space to yield an image that is substantially twice the OCT imaging depth minus any overlap between the planes.

7. The OCT system of claim 5, wherein:
an axial separation between the first reference plane and the second reference plane is substantially an OCT imaging depth minus any overlap between the planes; and
the first reference plane and the second reference plane each cover a positive OCT image space to yield an image that is substantially twice the OCT imaging depth minus any overlap between the planes.

8. The OCT system of claim 1, wherein:
a first reference arm has dispersion material.

9. The OCT system of claim 1, wherein:
a first reference arm has dispersion material that creates a first dispersion mismatch; and
a second reference arm has dispersion material that creates a second dispersion mismatch different from the first dispersion mismatch.

10. A method for generating an image with an optical coherence tomography (OCT) system, comprising:
providing a light beam;
splitting the light beam into a sample beam and a reference beam;
directing the sample beam along a sample path towards a sample, the sample path comprising a plurality of sample path ranges, the sample reflecting the sample beam to yield a reflected sample beam;
directing, by a reference arm system, the reference beam through each reference arm of a plurality of reference arms to yield a reflected reference beam, each reference arm corresponding to a sample path range of the plurality of sample path ranges, each reference arm associated with a specific dispersion level with a corresponding dispersion compensation parameter set, the dispersion compensation parameter set designed to address the specific dispersion level;
detecting, by a detector, the reflected sample beam and the reflected reference beam;
generating a detector signal in response to detecting the reflected sample beam and the reflected reference beam;
performing, by a computer, the following for each sample path range of the plurality of sample path ranges to yield image information for the sample path ranges:
selecting the dispersion compensation parameter set corresponding to the reference arm of the sample path range;
applying the dispersion compensation parameter set to the detector signal to yield image information; and
processing the image information to yield image information for the sample path range; and
generating an image of the sample from the image information for the plurality of sample path ranges, the image being generated based on image information that is processed with a plurality of dispersion compensation parameter sets that correspond to the plurality of sample path ranges.

11. The method of claim 10, the processing the image information to yield image information for the sample path range further comprising performing the following until an image quality satisfies an image quality criterion:
performing image processing on the image information;
generating a candidate image from the image information; and
evaluating the image quality of the candidate image.

12. The method of claim 10, the detector signal comprising a plurality of interference signals, each interference signal corresponding to a reference arm of the plurality of reference arms.

13. The method of claim 10, the sample comprising a sample within an eye.

14. The method of claim 10, the plurality of reference arms having a plurality of reference planes comprising a first reference plane and a second reference plane.

15. The method of claim 14, wherein:
an axial separation between the first reference plane and the second reference plane is substantially twice an OCT imaging depth minus any overlap between the planes; and
the first reference plane covers a positive OCT image space and the second reference plane covers a negative OCT image space to yield an image that is substantially twice the OCT imaging depth minus any overlap between the planes.

16. The method of claim 14, wherein:
an axial separation between the first reference plane and the second reference plane is substantially an OCT imaging depth minus any overlap between the planes; and
the first reference plane and the second reference plane each cover a positive OCT image space to yield an image that is substantially twice the OCT imaging depth minus any overlap between the planes.

17. The method of claim 10, wherein: a first reference arm has dispersion material.

18. The method of claim 10, wherein:
a first reference arm has dispersion material that creates a first dispersion mismatch; and
a second reference arm has dispersion material that creates a second dispersion mismatch different from the first dispersion mismatch.

19. An optical coherence tomography (OCT) system, comprising:
a light source configured to provide a light beam;
a beamsplitter configured to split the light beam into a sample beam and a reference beam;
one or more optical elements configured to direct the sample beam along a sample path towards a sample, the sample path comprising a plurality of sample path ranges, the sample reflecting the sample beam to yield a reflected sample beam;
a reference arm system configured to direct the reference beam through each reference arm of a plurality of reference arms to yield a reflected reference beam, each reference arm corresponding to a sample path range of the plurality of sample path ranges, each reference arm associated with a specific dispersion level with a corresponding dispersion compensation parameter set, the dispersion compensation parameter set designed to address the specific dispersion level, the plurality of reference arms having a plurality of reference planes comprising a first reference plane and a second reference plane;

a detector configured to:
  detect the reflected sample beam and the reflected reference beam; and
  generate a detector signal in response to detecting the reflected sample beam and the reflected reference beam; and
a computer configured to:
  perform the following for each sample path range of the plurality of sample path ranges to yield image information for the sample path ranges:
    select the dispersion compensation parameter set corresponding to the reference arm of the sample path range;
    apply the dispersion compensation parameter set to the detector signal to yield image information; and
    process the image information to yield image information for the sample path range by performing the following until an image quality satisfies an image quality criterion: perform image processing on the image information; generate a candidate image from the image information; and evaluate the image quality of the candidate image; and
  generate an image of the sample from the image information for the plurality of sample path ranges, the image being generated based on image information that is processed with a plurality of dispersion compensation parameter sets that correspond to the plurality of sample path ranges, wherein an axial separation between the first reference plane and the second reference plane is substantially twice an OCT imaging depth minus any overlap between the planes, and the first reference plane covers a positive OCT image space and the second reference plane covers a negative OCT image space to yield an image that is substantially twice the OCT imaging depth minus any overlap between the planes; or an axial separation between the first reference plane and the second reference plane is substantially an OCT imaging depth minus any overlap between the planes, and the first reference plane and the second reference plane each cover a positive OCT image space to yield an image that is substantially twice the OCT imaging depth minus any overlap between the planes.

\* \* \* \* \*